Figure 1:
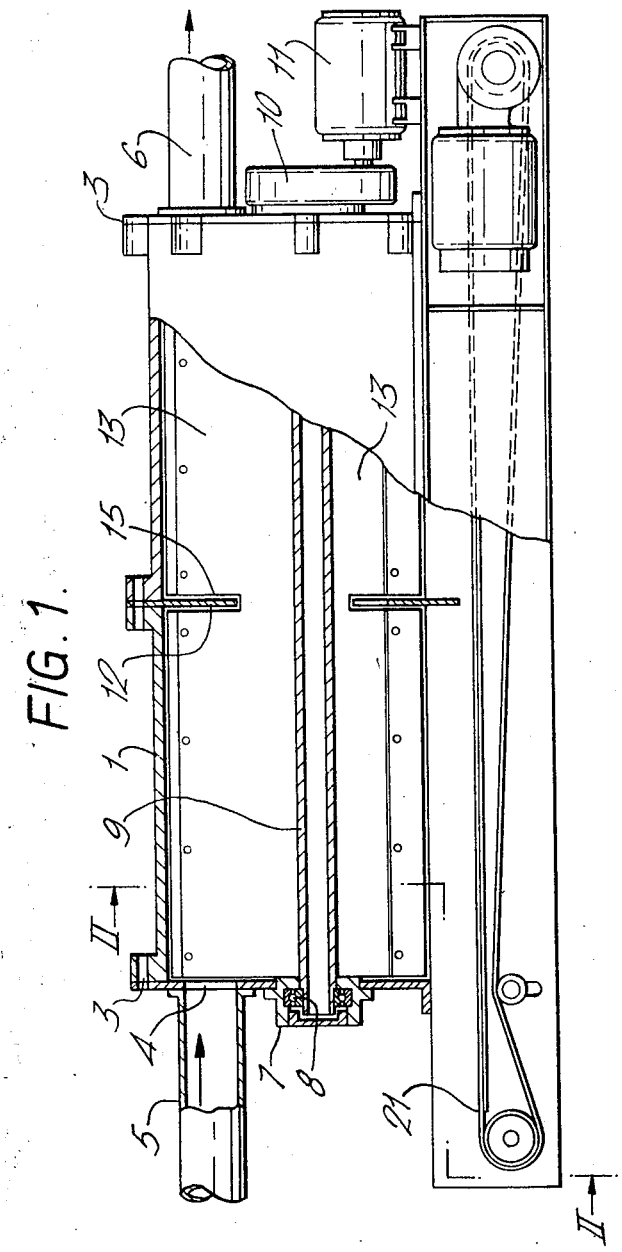

United States Patent [19]

Wightman

[11] 3,947,071

[45] Mar. 30, 1976

[54] APPARATUS FOR THE COLLECTION AND DISCHARGE OF MATERIAL

[75] Inventor: David Douglas Wightman, Whitley Bay, England

[73] Assignee: British Gas Corporation, London, England

[22] Filed: June 7, 1974

[21] Appl. No.: 477,332

[30] Foreign Application Priority Data

July 19, 1973 United Kingdom............... 34461/73

[52] U.S. Cl........................ 302/59; 302/49; 302/62
[51] Int. Cl.²......................................... B65G 53/46
[58] Field of Search ........... 222/168.5, 170; 302/28, 302/49, 59, 62

[56] References Cited
UNITED STATES PATENTS

| | | | |
|---|---|---|---|
| 521,159 | 6/1894 | Garraux............................ | 302/62 X |
| 525,428 | 9/1894 | Paine................................ | 302/59 X |
| 1,069,083 | 7/1913 | Gibson............................. | 302/49 |
| 1,143,634 | 6/1915 | Lane et al........................ | 302/49 X |
| 2,417,700 | 3/1947 | McCarty........................... | 302/49 X |
| 3,263,338 | 8/1966 | Gordon............................ | 302/49 X |
| 3,268,266 | 8/1966 | Brown.............................. | 302/49 |
| 3,311,420 | 3/1967 | Halstead.......................... | 302/49 |
| 3,399,931 | 9/1968 | Vogt................................. | 302/49 |
| 3,522,972 | 8/1970 | Kemp............................... | 302/49 |

FOREIGN PATENTS OR APPLICATIONS

| | | | |
|---|---|---|---|
| 348,808 | 5/1931 | United Kingdom............. | 302/59 |
| 302,412 | 12/1928 | United Kingdom............. | 302/59 |

Primary Examiner—Evon C. Blunk
Assistant Examiner—Jeffrey V. Nase
Attorney, Agent, or Firm—Larson, Taylor and Hinds

[57] ABSTRACT

Apparatus for the collection and discharge of material in a pneumatic conveying system comprising a cylindrical chamber having an inlet at one end thereof through which entrained air and solid matter is ducted into the chamber, an outlet at the other end thereof through which the air from which the solid matter has been separated is exhausted, an opening in the base of the chamber through which the separated material can be discharged, and a shaft carrying vanes extending radially thereof along the chamber so as to divide it into a number of sealed compartments which are selectively charged and discharged of material as the vanes are rotated.

1 Claim, 6 Drawing Figures

APPARATUS FOR THE COLLECTION AND DISCHARGE OF MATERIAL

This invention relates to apparatus for the collection and discharge of material in a pneumatic conveying system, that is to say a system in which material, e.g. powdered, granulated and fragmented matter is conveyed in conveyed in confined conditions from one position to another position by the use of a forced air flow which acts as a carrier for the material.

In some known forms of apparatus of the kind referred to the pneumatic conveyance of materials is restricted to those having a low moisture content since materials with a high moisture content tend to adhere to the internal surfaces of the collector or separator with a resultant deterioration in performance and eventual failure of the apparatus.

In my co-pending patent application Ser. No. 467,481 there is described a mechanical hole digging machine incorporating forms of apparatus for the collection and discharge of material cut away by a rotary cutting tool, and the present invention is particularly, although not exclusively, concerned with providing an improved form of material separation apparatus for use in such a machine which is less subject to the aforesaid disadvantage.

According to the present invention, apparatus for the collection and discharge of material comprises, a chamber having an inlet port through which entrained material and carrier air flow is introduced into the chamber and an outlet port through which air is exhausted from the chamber, partition means mounted for rotation within the chamber and adapted selectively to divide at least part of the chamber into a number of compartments, means for rotating the partition means whereby material caused in use to separate from the carrier flow in the chamber is deposited in at least one of said compartments and upon rotation of the partition means is transferred to a different compartment from whence it can be discharged from the chamber, and means adapted in use for reducing any tendency for the material to adhere to the partition means and/or the internal surfaces of the chamber.

Preferably, the partition means comprises a number of vanes extending substantially radially from a shaft member supported for rotation co-axially within a cylindrical part of the chamber.

Preferably, the means for reducing material adhesion to the inner walls of the chamber consists of a scraper member which may be a scraper bar removably attached to the partition means or formed as an integral part of the partition means, together with flexible membrane members attached to surfaces of the movable partition members and possibly other stationary surface parts of the chamber.

The apparatus may include means for effecting a seal between the rotatable partition means and the inner walls of the chamber.

In apparatus according to the invention, the chamber is designed to ensure a fall in velocity of the entrained air/material entering it whereby in use to cause separation by fall-out of the material from the carrier air which is exhausted to the outlet port. This may be achieved by arranging for the chamber to have a relatively large volume with or without a number of discreetly disposed baffles.

Conveniently, the rate of collection and discharge of material from the chamber can be adjusted by varying the speed of rotation of the partition means, the discharged material being removed by any suitable transporting means, for example, a conveyor system or chute.

Figure 2:
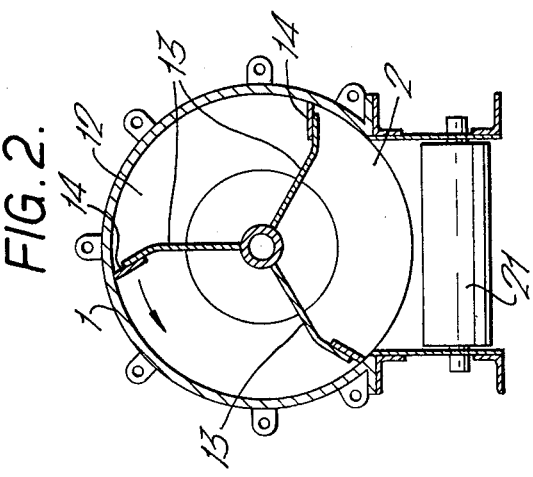
Figure 3:
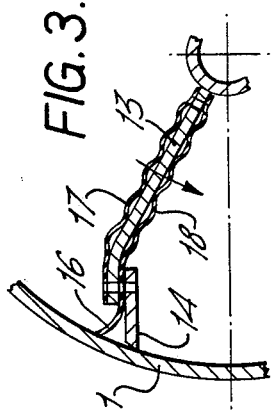
Figure 4:
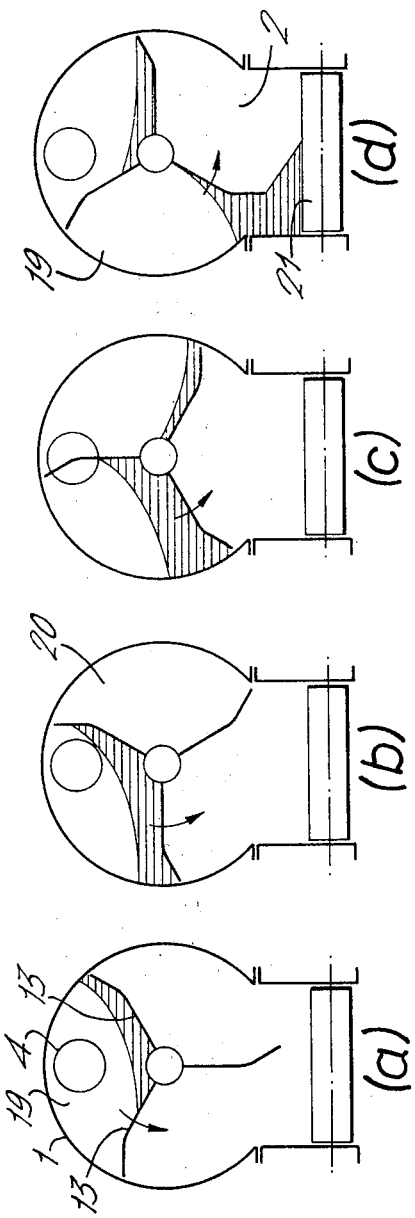
Figure 5:
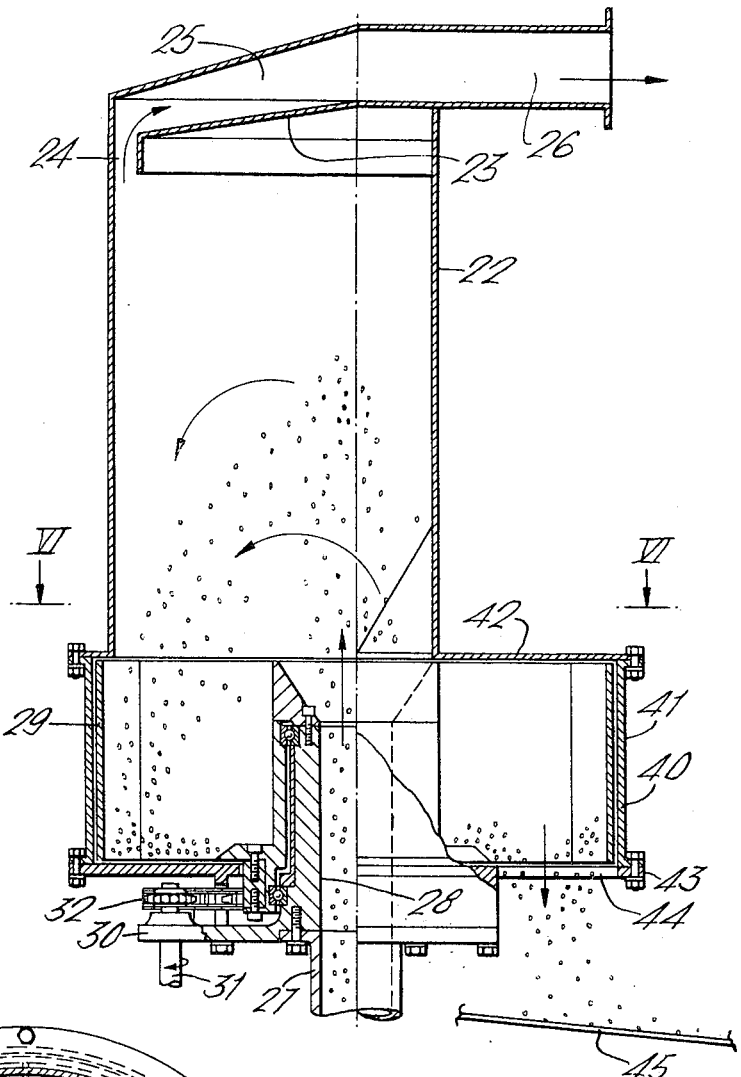
Figure 6:
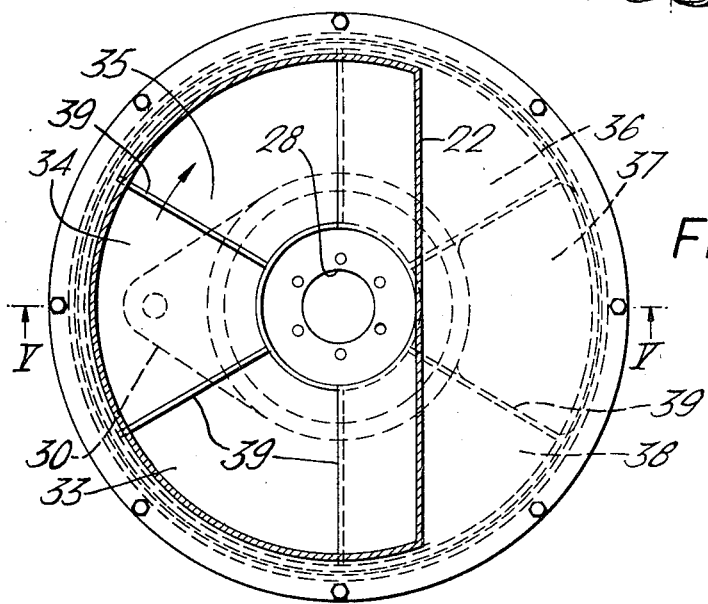

Two embodiments of the invention, designed for the collection and discharge of fragmented dry and moist spoil such as may be excavated for example by a mechanical digging machine described in my co-pending patent application Ser. No. 467,481 will now be described by way of example with reference to the accompanying diagrammatic drawings in which:

FIG. 1 is a partly broken away longitudinal sectional elevation of the first embodiment, FIG. 2 is a sectional end view on the line II—II of FIG. 1, FIG. 3 is an enlarged fragmentary sectional detail of part of FIG. 2, FIG. 4 shows sequentially the apparatus of the first embodiment in operation during the cycle of material separation, collection and discharge, FIG. 5 is a sectional side elevation of a second embodiment, taken on the line V—V of FIG. 6, and FIG. 6 is a sectional plan on the line VI—VI of FIG. 5.

Referring first to FIGS. 1 to 3, apparatus of the first embodiment comprises a cyclindrical separation chamber 1 arranged with its axis disposed horizontally having a discharge aperture 2 extending along the length of its lower portion. Both ends of the cylinder 1 are enclosed and sealed by plates 3, each of which has in its upper half a port 4 (only one of which is seen) preferably circular, in alignment with which an inlet duct 5 is mounted at the left and an exhaust duct 6 at the right. At the centre of each plate 3, and in alignment with the axis of the cylinder 1, a demountable hub 7 houses a conventional bearing unit 8. A shaft 9 supported by bearing units 8 extends the entire length of the cylinder 1 and is rotatable through a conventional fixed-ratio or variable-speed gearing 10 by a conventional drive unit 11.

As illustrated, for example in FIG. 1, the cylinder 1 comprises two similar sections with a baffle 12, preferably, but not essentially, annular in shape, interposed at the joint of the cylinder sections. Alternatively, the cylinder 1 may comprise one or more similar sections with or without baffles at the joining faces Alternatively one or more baffles, not illustrated, but similar to baffles 12 may be attached to and rotatable by the shaft 9.

Three radial vanes 13 are attached to and rotatable by the shaft 9 about the axis of cylinder 1. In its simplest form each vane extends as a single member radially outwards from shaft 9 leaving a narrow running clearance between its tip and the internal surface of cylinder 1, but preferably, the outer part of each vane is provided with a separate scraper member 14 attached to and radially adjustable relative to the inner part of the vane 13. In an axial direction, each vane extends the entire length of cylinder 1 with slots 15 (FIG. 1) to clear stationary baffles 12, where these are fitted.

To ensure an adequate air seal between the vane tips 14 and the cylinder 1, a flexible seal 16 (typically illustrates in FIG. 3) may be attached to the trailing face of each vane tip. Running clearances between vane and vane tips 13/14, plates 3 and baffles 12 may be similarly sealed.

As already described, effective pneumatic conveyance of moist materials depends partly on preventing a critical build-up of matter deposited and consolidated on the internal surfaces of a separating or collecting device. FIG. 3 shows flexible membrane 17 and 18 secured to the trailing and leading surfaces respectively of vanes 13. These membranes provide, during the discharge part of the operating cycle, surfaces which will deform under the weight of material adhering to them, causing the material to break away.

FIG. 4 illustrate a sequence in the cycle of material separation, collection and discharge where, for example, the device is shown with three equally spaced vanes 13. FIG. 4(a) depicts, for descriptive convenience, two of the vanes 13 forming together with cylinder 1 and plates 3 (FIG. 1) a compartment 19 pneumatically sealed except for the inlet orifice 4 and a similar outlet orifice 6 at the remote end of the compartment. As viewed in the drawing, the vanes are rotating in an anti-clockwise direction.

In operation of the apparatus, entrained air and solid spoil are ducted through the inlet duct 5 and are separated during their passage through the compartment by virtue of the reduction of velocity therethrough and by an arresting effect of the baffles 12. The solid spoil falls onto vanes 13 and the air is exhausted through duct 6 (FIG. 1). The spoil continues to accumulate in the compartment 19 as shown in FIGS. 4(b) and 4(c); until the position of the trailing vane, of the two vanes 13, relative to port 4, brings the adjacent compartment 20 into operation.

FIG. 4(d) shows the leading vane of compartment 19 in a position where the accumulated spoil is discharged gravitationally through the aperture 2 in the cylinder where it may be removed by conventional means, for example, by a belt conveyor 21.

Referring now to FIG. 5 and 6 apparatus of the second embodiment comprises a semi-cylindrical settling chamber 22 arranged with its axis vertically. The chamber is capped by a baffle 23 around which an annular space 24 allows air, from which the solid matter has been separated, to pass into an exhaust box 25 and exhaust duct 26 to atmosphere.

Entrained air and solid material enter the chamber 22 through a co-axial inlet duct 27 which also acts as a bearing support 28 for a rotatable unloading cylinder 29 housed in a lower cylindrical end of the chamber. A flanged extension 30 of the inlet duct 27 houses a drive shaft 31 connected to conventional fixed-ratio or variable-speed gearing driven by a conventional drive unit. The final drive of the unloading cylinder 29 may be by chain gearing 32 or other conventional means.

Typical positions of the compartments in the unloading cylinder are illustrated in FIG. 6, where compartments 33, 34 and 35 lie directly beneath the settling chamber 22 and compartments 36, 37 and 38 have rotated under the upper plate 42 and are thus sealed from the settling chamber. Partition member 39 may be provided with a scraper member such as is better shown in FIG. 2 and FIG. 3. Compartment 37 is shown aligned with an aperture 44 in the base 43 whereby it will be seen that solid material accumulated in the previous position of that compartment can be discharged gravitationally through the aperture 44 and removed, for example, by conveyor or chute (not shown). In operation of this apparatus entrained air and solid matter undergo a drop in velocity as they enter the settling chamber 22 causing the solid matter to fall into appropriate compartments rotating across the base of the lower chamber 40. In sequence, each compartment is sealed off from the lower pressure of the settling chamber and opened to atmosphere when solid material is discharged onto a conveyor or chute.

I claim:

1. Apparatus for the collection and discharge of excavated, fragmented material comprising a settling chamber, having an upper portion and a lower portion, a rotatable cylindrical chamber housed in the lower portion of said settling chamber, said rotatable cylindrical chamber having a vertical axis and means including an inlet port through which entrained material and carrier air flow is introduced through the cylindrical chamber into the upper portion whereby said material is separated from said carrier air flow, the axis of said inlet port being coincident with the vertical axis of said rotatable cylindrical chamber, partition means in said cylindrical chamber to divide at least part of the cylindrical chamber into a number of compartments, means for rotating said cylindrical chamber about said vertical axis whereby said separated material is deposited in at least one of said compartments and upon rotation of the cylindrical chamber is transferred to a different location in the lower portion of the settling chamber from whence it can be discharged from the cylindrical chamber, means for reducing any tendency for the material to adhere to the partition means and an internal surface of the lower portion of the settling chamber, the upper portion of the settling chamber forming a partially cylindrical expansion chamber into which entrained air and material is delivered from said inlet port, said expansion chamber containing an outlet port and being capped by a baffle defining an air exhaust passage communicating with said outlet port, said partially cylindrical expansion chamber having a substantially uniform cross-section extending from the lower portion to said baffle.

* * * * *